Sept. 27, 1938.  W. S. LITTLE  2,131,351
COMBINED SEARCHLIGHT AND TESTER
Filed June 1, 1937
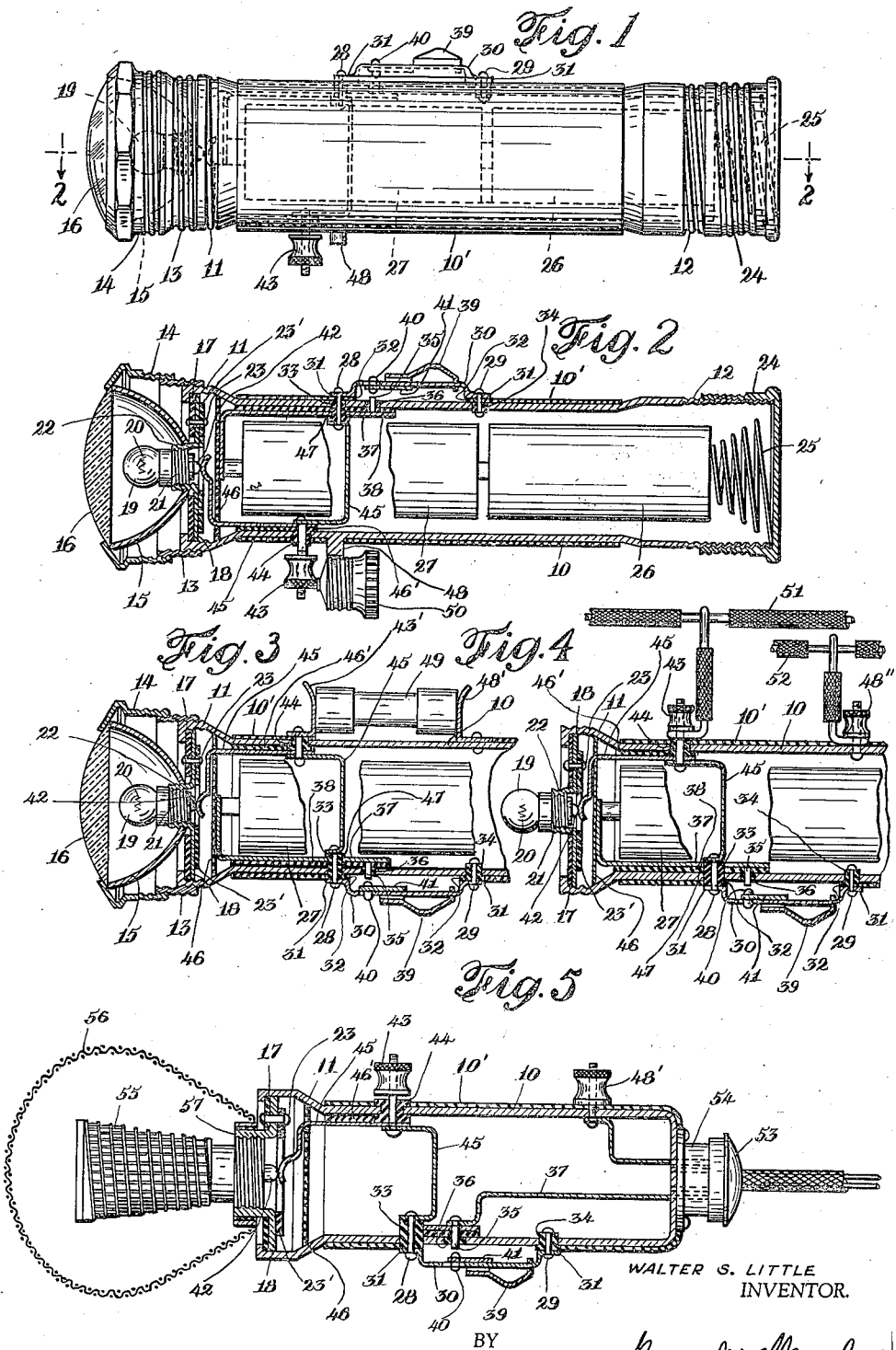
WALTER S. LITTLE
INVENTOR.
BY
ATTORNEY.

Patented Sept. 27, 1938

2,131,351

UNITED STATES PATENT OFFICE 2,131,351

COMBINED SEARCHLIGHT AND TESTER

Walter S. Little, Manchester, N. H., assignor of one-half to John L. Sullivan, Manchester, N. H.

Application June 1, 1937, Serial No. 145,657

8 Claims. (Cl. 175—183)

This invention relates generally to electrical circuits, but more specifically to an electrical circuit capable of use in testing devices for electrical conductors, fuse plugs, electric light wiring, motors, ignition wiring and various other types of electrical circuits.

The main object of the invention resides in the provision of an electrical circuit including a resistance element to detect variations of current passing through the said resistance element whenever an external conductor or circuit is connected to the resistance element in parallel.

A further object of the invention herein resides in the provision of a searchlight capable of testing electrical conductors and external circuits, the said conductors and external circuits being introduced externally of the searchlight casing into the searchlight circuit as a shunt across the bulb. The external circuit under test is shunted across the bulb in the searchlight circuit only when the latter is closed. If the external circuit is open or broken, the bulb remains incandescent, whereas if the external circuit is closed, the lamp is extinguished because of the shunting thereof.

Another object of the invention resides in the provision of a portable apparatus adapted to test an electrical conductor or external circuit whose resistance is of a value sufficiently low to permit diversion of enough current from the said detecting element to interfere with its normal incandescence or sound. This instant object of the invention contemplates the substitution of forms of detecting elements other than the ordinary searchlight bulb.

A still further object of the invention resides in the production of a searchlight wherein the electrical connections are so arranged, relative to the casing, that when the switch mechanism or circuit closer is open, the circuit cannot be closed by external electrical conductors such as a tool in a tool box or a metallic sheath.

The invention has, among its other objects, the production of a device of the kind described that is simple, portable, convenient, durable, efficient and capable of independent operation aside from its function as a tester, and wherein the source of power is either inside or outside of the casing. Moreover, the invention contemplates the construction of an infallible detector in contradistinction to those detectors or testers wherein the circuits or apparatus under test are introduced in series. In the latter construction, where for any reason the main circuit itself is defective, the detector will not operate regardless of whether the external circuit is open or closed.

These objects and other incidental ends and advantages of the invention will hereinafter appear in the progress of the disclosure and as pointed out in the appended claims.

Accompanying this specification is a drawing showing preferred forms of the invention wherein corresponding reference characters designate corresponding parts throughout the several views.

In the drawing:

Figure 1 is an elevation of one embodiment of the invention in the form of a searchlight.

Figure 2 is a sectional view on line 2—2 of Figure 1 which shows the circuit closer open, whereby the circuit cannot be shunted externally of the casing, means also being shown for connecting a fuse plug to the casing as a shunt across the bulb.

Figure 3 is a fragmentary view in section similar to Figure 2 wherein a cartridge fuse is connected to the casing as a shunt across the bulb.

Figure 4 is another fragmentary view in section wherein an external electrical circuit is connected to the casing as a shunt across the bulb.

Figure 5 is a longitudinal view in section showing another embodiment of the invention wherein an external power source and another form of detecting device are used in conjunction with a casing.

In accordance with the preferred forms of the invention illustrated on the accompanying drawing, numeral 10 designates any cylindrical portable casing used for searchlights and as shown is of conductive metallic material, the form and material of the casing being optional. The outer surface of casing 10 may be provided with a non-conducting sleeve member, an enameled surface being disclosed as shown at 10'. End portions 11 and 12 of casing 10 are threaded, the forward end 11 having an auxiliary threaded band member 13 engaging with 11. A threaded cap member 14 engages with the band member 13, the said cap member securing a reflector 15 within the open front end of the casing. A lens 16 is interposed between the cap member 14 and the reflector 15, the said reflector being supported on a disk 17 of insulating material, the latter forming the front wall of casing 10.

Disk 17 is secured to an inner metallic disk 18 which latter is in mechanical and electrical connection with casing 10. The reflector 15 plays no part in the electrical circuits hereinafter to be described, the said reflector at the base thereof having the usual electric bulb 19 provided with a filament 20 penetrating therethrough. One terminal of filament 20 is represented by shell 21 of bulb 19 while the other terminal of the said filament 20 is represented by numeral 42. The terminal of filament 20 represented by shell 21 is electrically connected to casing 10 by means of bulb socket 22 which is electrically and mechanically connected to metallic disk 18, the said socket projecting above a central opening in disks 17 and 18. A rivet 23 illustrates one way of integrating insulating disk 17, metallic disk 18 and another transverse insulating strip 23'.

A threaded end cap member 24 of the casing engages the threaded end portion 12 of the said casing, the end cap member being preferably of a conducting material. Secured against the inner side of the outer wall of cap member 24 is the usual compression spring 25 which engages with the cathode of a battery 26, cells 26 and 27 hooked up in series making up the battery in one embodiment of the invention as shown in Figures 1, 2, 3 and 4.

Thus the cathode of the battery is electrically connected to casing 10. Where end cap member 24 is of a non-conducting material, a conductor strip may be interposed between the base of the compression spring 25 and the casing 10.

A preferably metallic housing 30 having attaching brackets 31, 31 is secured to the casing 10 by any means such as rivets 28 and 29. The open end of housing 30 lies adjacent to the surface of casing 10 and is insulated therefrom by means of insulating strips 32, 32. Rivets 28 and 29 are also insulated from casing 10 by having associated therewith non-conducting bushings 33 and 34 respectively.

On the surface of casing 10 and shielded within the housing 30 is mounted a switch contacting terminal 35 insulatedly mounted on casing 10 through an insulating bushing 36, the said contacting terminal 35 being electrically connected to the anode of cell 27 by means of a conducting strip 37 insulated from casing 10 by any means such as insulation strip 38. Conductor 37 and insulating strip 38 may be mechanically joined to casing 10 by any means such as the aforementioned rivet 28.

The housing 30 in its upper wall is provided with a preferably metallic and slidable switch arm 39 and is adapted to depress a switch arm contact 40 projecting above an orifice in the upper wall of housing 30, the said contact 40 being secured to the underside of the wall of housing 30 by means of a leaf spring 41. Thus when slidable switch arm 39 passes over the projecting contact 40, the latter is depressed and makes electrical contact with the switch contacting terminal 35 within the housing 30.

One terminal of filament 20 represented by shell 21 has already been described as being in electrical connection with casing 10. The other terminal 42 of filament 20 is in electrical connection with a testing terminal 43, the latter being insulatedly mounted on casing 10 by any means such as a bushing 44 and is also in electrical connection with housing 30 by means of a conductor 45 proceeding from the said filament terminal 42. Conductor 45 passes between insulating strip 23' and another transverse insulating strip 46 situated above the anode of cell 27, strips 23' and 46 serving to prevent electrical contact between conductors 45 and 37. Conductor 45 then proceeds to testing terminal 43, and lies on another strip of insulation 46' secured to casing 10. From testing terminal 43, conductor 45 proceeds to be electrically connected to housing 30, the end of the conductor 45 being joined to rivet 28. An insulating strip 47 is interposed between the end of conductor 45 and conducting strip 37.

Where the metallic casing 10 is not provided with any insulation, the casing itself acts as a testing terminal in conjunction with the testing terminal 43, the said two terminals from the aforementioned description being electrically connected in parallel across the bulb 19. If the casing 10 is insulated or is provided with a covering, the insulation must first be removed in order that casing 10 serve as a testing terminal. Any conductor may be grounded to casing 10 to serve as a second testing terminal such as burr 48.

The circuit, as best shown in Figure 2, may be traced from the cathode of cell 26 through compression spring 25, cap 24, casing 10, metallic disk 18, socket 22, shell terminal 21 of filament 20, filament 20, terminal 42 of filament 20, conductor 45, testing terminal 43, rivet 28, housing 30, switch arm 39, leaf spring 41, and switch arm contact 40. There is an opening in the circuit between switch arm contact 40 and its associated switch contacting terminal 35 which latter proceeds through conductor 37 to the anode of cell 27. Thus when switch arm contact 40 touches the switch contacting terminal 35 by sliding switch arm 39 thereover, the circuit is closed and the bulb becomes illuminated.

It is to be understood that where casing 10 is non-metallic, another conductor having the same electrical connections as from the cathode of cell 26 to one terminal of filament 20 may be substituted therefor.

It is also to be observed that when the switch mechanism is open, the battery cannot be shorted externally of the casing since metallic casing 10 and one terminal of filament 20 are connected to the cathode of cell 26, while housing 30 and the testing external terminal 43 are joined to the other filament terminal. By shorting casing 10, housing 30 and testing terminal 43 in any manner, an incomplete circuit is made from the cathode of cell 26, through casing 10, through filament 20, through terminal 43 and to housing 30. The switch contacting terminal 35 is insulated from casing 10 and thus shielded from any possible external electrical conducting relation with housing 30, casing 10 and terminal 43. The circuit can be closed externally of the casing only through the switch mechanism.

When the circuit is closed through the switch mechanism, bulb 19 is illuminated and testing terminal 43 and casing 10 or the grounded terminal 48 thereto are connected in parallel to the bulb 19.

Instead of employing testing terminal 43 in the form of a binding post, a bracket 43' may be substituted therefor as shown in Figure 3, while in place of a burr 48 being grounded to casing 10, another bracket 48' may be substituted therefor in order to accommodate a cartridge fuse 49 which is under test. In Figure 2, a plug fuse 50 is shown which can be tested between testing terminal 43 and burr 48. In Figure 4, a binding post 48" is substituted for burr 48 or bracket 48' in order to electrically connect any external circuit whose terminals are represented by wire portions 51 and 52.

In the combined searchlight and trouble shooter under consideration, the introduction of an external circuit with voltage may have the effect of extinguishing or burning out the bulb or other detecting device used, depending upon the polarity of the external circuit introduced. Precaution should therefore be taken when introducing external circuits under test having electrical power running therethrough.

To test external circuits of comparatively high resistances, a resistance cone such as 55 having a wire-mesh guard 56 therearound is substituted for electric bulb 19, the said cone being adapted to have a much higher resistance than the external circuit if the latter is to operate as a shunt. Where the resistance of the detecting means in the searchlight circuit is increased, it becomes necessary to introduce a greater power source in order to pass current through the said circuit. For this purpose the power from a storage battery or other power line is plugged into receptacle 54 as a substitute for the power derived from cells 26 and 27 of the searchlight. Where resistance cone 55 is used as a detecting device, an enlarged socket 57 is substituted for bulb socket 22.

I wish it distinctly understood that minor changes and variations in the electrical connections, construction, integration, material, form, position and size of the various parts constituting an embodiment of the invention together with minor changes in the steps of the method of the invention may all be resorted to without departing from the spirit of the invention and without departing from the scope of the appended claims.

I claim:

1. In a flash and testing light construction including a tubular conductive casing adapted to receive flashlight cells and having a cell terminal engaging element at one end of the casing and a lamp at the other end thereof, a lamp socket conductively connected to the casing and open to the interior thereof, an L-shaped contact strip having one leg extending along the inner face of the casing and the other leg extending radially inward from the forward end of the first leg to lie across the inwardly opening end of the lamp socket for forming a contact for the central contact of a lamp, a testing terminal located on the exterior of the casing and insulated therefrom, said testing terminal being positioned opposite the rear end of the contact strip, an insulated pin conductively connecting the testing terminal and contact strip, a second L-shaped contact strip having one leg extending along the inner face of the casing in insulated relation thereto and having its other leg extending radially inward to form contact with the forward terminal of a battery, a switch contact fixed to the rear end of the second contact strip and extending through the casing wall in insulated relation thereto, a switch housing mounted on the casing in insulated relation thereto, a conductive rivet securing one end of the housing in place and insulated from the casing, a conductor connecting the first insulated pin and said rivet, and a switch contact movably mounted on the housing for engagement and disengagement with the first switch contact.

2. In a flash and testing light construction including a tubular conductive casing adapted to receive flashlight cells and having a cell terminal engaging element at one end of the casing and a lamp at the other end thereof, a lamp socket conductively connected to the casing and open to the interior thereof, an L-shaped contact strip having one leg extending along the inner face of the casing and the other leg extending radially inward from the forward end of the first leg to lie across the inwardly opening end of the lamp socket for forming a contact for the central contact of a lamp, a testing terminal located on the exterior of the casing and insulated therefrom, said testing terminal being positioned opposite the rear end of the contact strip, an insulated pin conductively connecting the testing terminal and contact strip, a second L-shaped contact strip having one leg extending along the inner face of the casing in insulated relation thereto and having its other leg extending radially inward to form contact with the forward terminal of a battery, a switch contact fixed to the rear end of the second contact strip and extending through the casing wall in insulated relation thereto, a switch housing mounted on the casing in insulated relation thereto, a conductive rivet securing one end of the housing in place and insulated from the casing, a conductor connecting the first insulated pin and said rivet, a switch contact movably mounted on the housing for engagement and disengagement with the first switch contact, and a second testing terminal mounted directly on the casing parallel to the first terminal.

3. In a testing construction including a conductive casing having at one end thereof a testing terminal connected to a terminal of electric power and a resistance member at the other end thereof, a socket for the resistance member conductively connected to the casing and open to the interior thereof, a contact strip within the casing in insulated relation thereto and having one end contacting the other terminal of the resistance member, a second testing terminal located on the exterior of the casing in insulated relation thereto and being conductively connected to the other end of the contact strip, a second contact strip within the casing and in insulated relation thereto, one end forming contact with the other terminal of electric power, a switch contact point fixed to the other end of the second contact strip and extending through the casing wall in insulated relation thereto, a switch housing mounted on the casing in insulated relation thereto, a conductive rivet securing one end of the housing in place and insulated from the casing, a conductor connecting the second testing terminal and said rivet, a switch contact movably mounted on the housing for engagement and disengagement with the first switch contact.

4. In a testing construction including a conductive casing and terminals from a source of electric power, the conductive casing at a portion being connected to one terminal of said source of electric power and at another portion having a removable resistance element, one terminal of the resistance element being conductively connected to the casing and the other terminal being open to the interior thereof, a testing terminal located on the exterior of the casing in insulated relation thereto, a contact strip within the casing conductively connecting the second terminal of the resistance element with the testing terminal, a second contact strip within the casing and at one end forming contact with the other terminal of the source of electric power and a switch contact point fixed to the other end of the second contact strip and extending through the casing wall in insulated relation thereto, a switch arm mounted on the casing in insulated relation thereto and conductively connected to the testing terminal, the switch arm being adapted to engage and disengage the said switch contact point.

5. In a flash and testing light construction including a tubular conductive casing adapted to receive flashlight cells and having a cell terminal engaging element at one end of the casing and a lamp at the other end thereof, a lamp socket conductively connected to the casing and open to the interior thereof, a contact strip within the casing at one end forming a contact for the central contact of the lamp, a testing terminal located on the exterior of the casing and insulated therefrom and conductively connected to the other end of the said contact strip, a second contact strip within the casing and at one end forming contact with the forward terminal of a battery and a switch contact point fixed to the other end of the second contact strip and extending through the casing wall in insulated relation thereto, a switch arm mounted on the casing in insulated relation thereto and a conductor joining the said switch arm to the testing terminal, the switch arm being adapted to engage and disengage the said switch contact point.

6. In a flash and testing light construction as set forth in claim 5 wherein a second testing terminal is mounted directly on the casing and opposite to the first testing terminal.

7. In a testing construction including a casing and terminals from a source of electric power, the casing at one portion having a removable resistance element, one terminal of the resistance element being conductively connected to one terminal of the source of electric power and the other terminal of the resistance element being open to the interior thereof, a testing terminal located on the exterior of the casing, a contact strip within the casing conductively connecting the second terminal of the resistance element with the testing terminal, a second contact strip within the casing and at one end forming contact with the other terminal of the source of electric power and a switch contact point fixed to the other end of the second contact strip and extending through the casing wall, a switch arm mounted on the casing and conductively connected to the testing terminal, the switch arm being adapted to engage and disengage the said switch contact point, and a complemental testing terminal on the casing conductively connected to the first mentioned terminal of the source of electric power.

8. In a flash and testing light construction including a tubular casing adapted to receive flashlight cells and having a cell terminal engaging element at one end of the casing and a lamp at the other end thereof, a lamp socket conductively connected to the cell terminal engaging element and open to the interior thereof, a contact strip within the casing at one end forming a contact for the central contact of the lamp, a testing terminal located on the exterior of the casing and conductively connected to the other end of the said contact strip, a second contact strip within the casing and at one end forming contact with the forward terminal of a battery and a switch contact point fixed to the other end of the second contact strip and extending through the casing wall, a switch arm mounted on the casing and a conductor joining the said switch arm to the testing terminal, the switch arm being adapted to engage and disengage the said switch contact point, and a complemental testing terminal on the exterior of the casing conductively connected to the lamp socket and cell terminal engaging element.

WALTER S. LITTLE.